United States Patent
Duch et al.

(10) Patent No.: US 10,442,244 B2
(45) Date of Patent: Oct. 15, 2019

(54) SEALING DEVICE FOR A WHEEL-HUB UNIT AND WHEEL-HUB UNIT EQUIPPED WITH SUCH A SEALING DEVICE

(71) Applicant: Aktiebolaget SKF, Gothenburg (SE)

(72) Inventors: Daniele Duch, San Gillio (IT);
Domenico Bosco, Borgaro Torinese (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 16/027,417

(22) Filed: Jul. 5, 2018

(65) Prior Publication Data
US 2019/0184739 A1 Jun. 20, 2019

(30) Foreign Application Priority Data
Dec. 18, 2017 (IT) .................. 102017000097373

(51) Int. Cl.
| | |
|---|---|
| *F16C 13/02* | (2006.01) |
| *F16C 33/76* | (2006.01) |
| *F16C 41/00* | (2006.01) |
| *B60B 27/00* | (2006.01) |
| *F16C 33/78* | (2006.01) |

(52) U.S. Cl.
CPC .......... *B60B 27/0073* (2013.01); *F16C 33/78* (2013.01); *B60B 2900/511* (2013.01); *F16C 2326/02* (2013.01)

(58) Field of Classification Search
CPC ............ B60B 27/0068; B60B 27/0073; B60B 2900/5112; B60B 2900/5114; F16C 33/78; F16C 33/782; F16C 33/7826; F16C 33/783; F16C 33/7873; F16C 2326/02
See application file for complete search history.

(56) References Cited

U.S. PATENT DOCUMENTS

| | | | | |
|---|---|---|---|---|
| 7,980,766 B2* | 7/2011 | Tsuzaki | ............... | B60B 27/0084 384/489 |
| 8,382,377 B2* | 2/2013 | Yamamoto | .......... | B60B 27/0005 384/448 |
| 8,393,795 B2* | 3/2013 | Aritake | ................. | F16C 41/007 384/489 |
| 9,091,303 B2* | 7/2015 | Inohae | ................ | B60B 27/0005 |
| 2003/0059138 A1* | 3/2003 | Nantua | ................... | F16C 33/78 384/448 |
| 2013/0209016 A1* | 8/2013 | Inohae | ................ | B60B 27/0005 384/446 |

* cited by examiner

*Primary Examiner* — Phillip A Johnson
(74) *Attorney, Agent, or Firm* — Bryan Peckjian; SKF USA Inc. Patent Dept.

(57) ABSTRACT

Sealing device for a wheel-hub unit provided with a rolling bearing and having a central axis and being provided with a screen joined together with an outer ring of the bearing to sealingly isolate the bearing and having a cylindrical mounting wall coaxial with the central axis and engaged with a collar of an outer ring of the bearing, and an annular reading wall, arranged transversely with respect to the axis, connected to the cylindrical wall and facing a phonic wheel mounted inside the bearing; the annular reading wall having a thickness variable radially depending on an angle of oscillation of the phonic wheel between an undeformed position. An annular front surface of the phonic wheel is equidistant from a plane perpendicular to the axis, and a possible deflected position, in which the annular front surface of the phonic wheel is arranged equidistant from an annular reading wall.

4 Claims, 1 Drawing Sheet

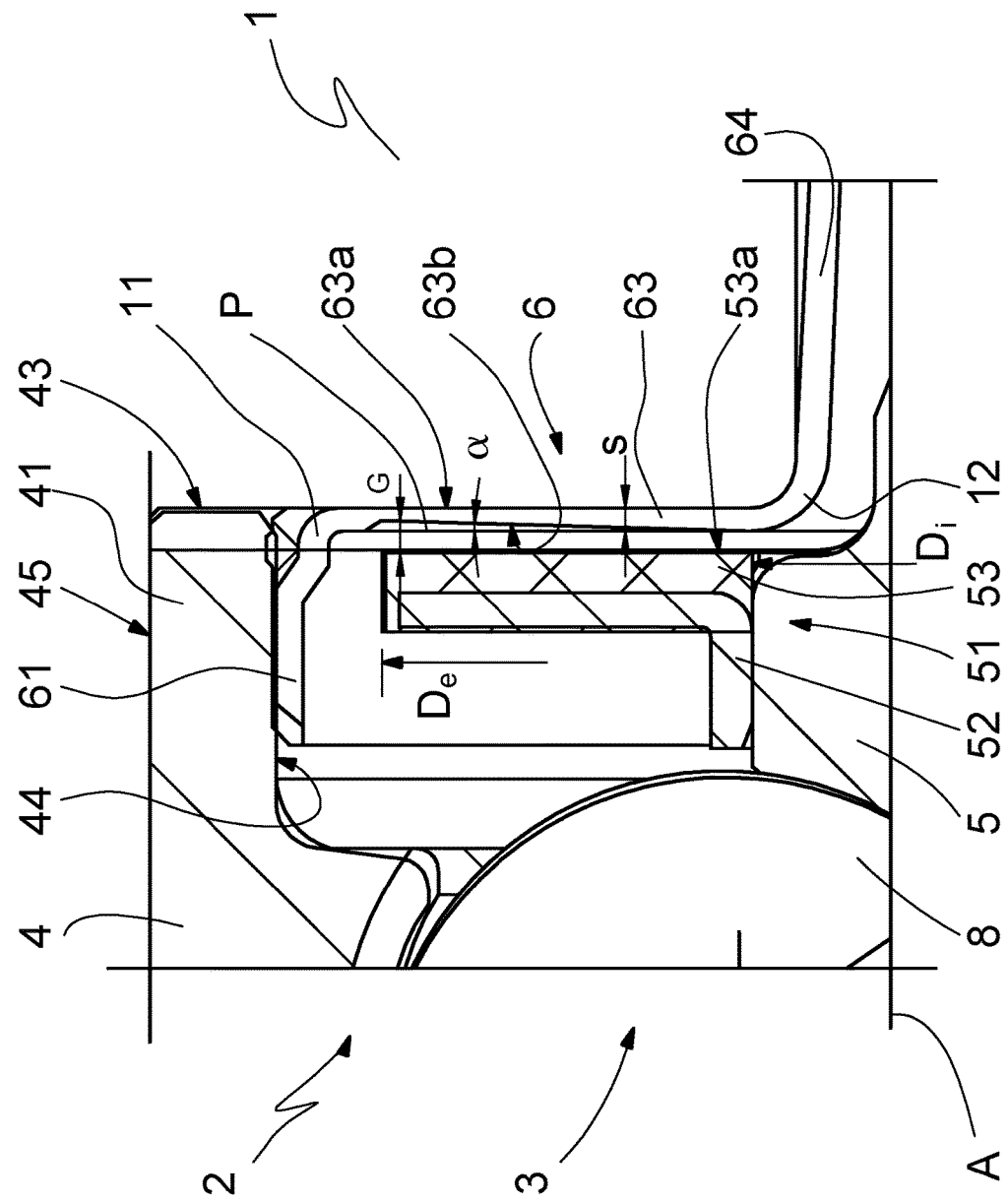

SEALING DEVICE FOR A WHEEL-HUB UNIT AND WHEEL-HUB UNIT EQUIPPED WITH SUCH A SEALING DEVICE

CROSS-REFERENCE

This application claims priority to Italian patent application no. 102017000097373 filed on Aug. 30, 2017, the contents of which are fully incorporated herein by reference.

TECHNOLOGICAL FIELD

The present invention relates to a sealing device for a wheel-hub unit. The invention also relates to a wheel-hub unit equipped with such a sealing device.

The present invention is particularly suitable, although not exclusively, in the field of wheel-hub units of motor vehicles provided with a wheel rolling bearing. In these applications, the inner ring of the bearing is keyed onto the axis of the wheel and transmits the consequent rotational movement thereof, while the outer ring of the bearing is keyed onto a fixed hub, for example a hub of a motor vehicle suspension. The description which follows will refer, by way of example, to this specific application without thereby losing its general character.

BACKGROUND

The sealing devices of the known type have an axial-symmetrical "cup-shaped" form, which is centrally closed in applications intended for wheels which are non-driving and therefore do not have a shaft passing along the axis of the bearing, and laterally close the outer ring of the bearing, forming a static seal for protecting the bearing from any environmental contamination (water, mud, dirt, etc.).

In their more general form, the sealing devices comprise a screen, which is more or less cup-shaped, the screen being mounted on a collar of the outer ring of the rolling bearing by means of an interference force fit, and comprise in particular:

a cylindrical mounting wall, which is coaxial with an axis of symmetry of the bearing and which engages by means of the force fit with the collar of the outer ring of the bearing; and an annular reading wall, which is transverse to the axis of symmetry and the cylindrical mounting wall, is rigidly connected to the cylindrical mounting wall and is arranged between a detection sensor mounted on the outside of the bearing and a phonic wheel mounted on an inner ring of the bearing, with which it defines a reading gap with given axial dimensions depending essentially on the positions of the phonic wheel and the screen, the thickness of the screen and the position of the detection sensor. The reading gap is normally designed to have extremely small axial dimensions so as to avoid reducing the capacity of a signal from the phonic wheel reaching correctly and in a clear and clean manner the detection sensor.

Analyzing the wear condition of both the screens and the phonic wheels it has been established that, owing to the dynamic action of the wheels connected to the wheel-hub units of motor vehicles, the inner ring of the bearing is subject to deflections which, in many cases, cause deviation of the phonic wheel which, precisely because of the small axial dimensions of the reading gap, accidently comes into contact with the annular reading wall of the screen.

Such accidental contact over time results in wear of the screen, in some cases negatively affecting the sealing capacity, as well as wear of the magnetized portion of the phonic wheel, causing a reduction of its emitted signal.

SUMMARY

The object of the present invention is to provide a sealing device for a wheel-hub unit which is able to solve the problems described above in a simple and low-cost manner, while maintaining the same sealing and signal emission characteristics.

According to the present invention a sealing device for a wheel-hub unit provided with a rolling bearing, having the characteristic features described in the attached independent claim, is described.

A wheel hub unit as defined in claim 4 is also provided.

Further, preferred and/or particularly advantageous, embodiments of the invention are described in accordance with the characteristic features indicated in the attached dependent claims.

BRIEF DESCRIPTION OF THE DRAWINGS

The invention will now be described with reference to the attached FIGURE which shows a non-limiting example of embodiment of a sealing device for a wheel-hub unit according to the present invention.

DETAILED DESCRIPTION

With reference to the attached FIGURE, 1 denotes in its entirety a sealing device for a wheel-hub unit 2.

The unit 2 is provided with a rolling bearing 3 comprising an outer ring 4, coaxial with an axis of rotation A (indicated schematically in the attached FIGURE) of the bearing 3, an inner ring 5 coaxial with the outer ring 4, and a plurality of rolling members 8, for example balls, arranged between the outer ring 4 and the inner ring 5 so as to allow rotation of the inner ring 5, which is rotating during use, with respect to the outer ring 4, which is fixed during use. The outer ring 4 of the bearing 3 has a collar 41 which is bounded by an annular front surface 43, by a cylindrical, inner, side surface 44 and by a cylindrical, outer, side surface 45. The inner ring 5 is instead provided with a phonic wheel 51, which is rigidly connected to the inner ring 5 and has a mounting support 52 defined, preferably, by a folded metal plate with an L-shaped cross-section, and a ring 53 of ferromagnetic material which is secured to the support 52 and bounded at the front by an annular front surface 53a.

The sealing device 1, according to the present invention, has an axis A as central axis and comprises a screen 6 which is joined together with the outer ring 4 of the bearing 3, has a substantially cup-shaped form and comprises:

a cylindrical mounting wall 61, coaxial with the axis A and engaged by means of an interference fit against the surface 44 of the collar 41 of the outer ring 4;

an annular reading wall 63, which is arranged transversely with respect to the axis A and is connected to the cylindrical wall 61 with which it forms a radially outer elbow 11; and a frustoconical wall 64, which has a conicity tapering on the opposite side to the bearing 3 and which is connected to the annular reading wall 63 via a radially inner elbow 12.

The annular reading wall 63 is arranged between a detection sensor (not shown) mounted on the outside of the bearing 3 and the phonic wheel 51 mounted on the inside of the bearing 3 and has an outer annular surface 63a perpendicular to the axis A and an inner annular surface 63b which faces the annular front surface 53a of the phonic wheel S, namely of its ring 53 of ferromagnetic material, and forms together with this annular front surface 53a a reading gap G with radially variable dimensions depending on a thickness S of the annular wall 63 defined by an axial distance of the outer annular surface 63a from the annular inner surface 63b.

In the preferred example of embodiment shown in the attached FIGURE, the cylindrical mounting wall 61 is engaged by means of an interference fit against the surface 44 of the collar 41, but, according to a preferred embodiment which is not shown but may be easily deduced from that described, the cylindrical mounting wall 61 could also be engaged by means of an interference fit against the surface 45 of the collar 41.

The thickness S of the annular reading wall 63 decreases in the direction radially away from the axis A, from its maximum value Smax measured substantially at the radially inner elbow 12, to its minimum value Smin measured substantially at the radially outer elbow 11 and forms, together with a plane P perpendicular to the axis A, passing substantially through the elbow 12, an angle α of oscillation. In particular, the annular reading wall 63 has a thickness S with a value corresponding to its maximum value Smax substantially at an inner diameter Di of the phonic wheel 51 and a thickness S with a value corresponding to its minimum value Smin substantially at an outer diameter De of the phonic wheel 51.

The radial variation in the thickness S of the annular reading wall 63 determines a complementary radial variation in the axial dimension of the reading gap G, such as to allow the phonic wheel 51 to be able to oscillate, following the deflections of the inner ring 5, so as to cover an arc with an extension equal to the angle of oscillation α between an undeformed position, in which the annular front surface 53a is equidistant from the plane P (shown in the attached FIGURE), and a deflected position (not shown in the attached drawing), in which the annular front surface 53a is more or less equidistant from the inner annular surface 63b, but does not make contact with the screen 6, namely with the annular reading wall 63.

The sealing device 1 described above in a preferred embodiment thereof has not only undoubted advantages during use of the wheel-hub unit 2, ensuring an optimum and constant signal reading performance of the phonic wheel 51, protecting from any damage both the phonic wheel 51 and the screen 6, but is also such that, during the design stage, a major reduction in the size of the reading gap G may be achieved, while helping increase the reading capacity of the detection sensor (not shown).

According to the invention, owing to the sealing device 1, a wheel-hub unit 2 such as that already described above is obtained, wherein the screen 6 comprises:

a cylindrical mounting wall 61, coaxial with the axis A and engaged by means of an interference fit against the surface 44 of the collar 41 of the outer ring 4;

an annular reading wall 63, which is arranged transversely with respect to the axis A, is connected to the cylindrical wall 61 with which it forms a radially outer elbow 11 and is arranged between a detection sensor (not shown) mounted on the outside of the bearing 3 and the phonic wheel 51 mounted on the inside of the bearing 3; and a frustoconical wall 64, which has a conicity tapering on the opposite side to the bearing 3 and is connected to the annular reading wall 63 via a radially inner elbow 12.

In the wheel-hub unit 2 described above, preferably in combination with the aforementioned characteristics, the annular reading wall 63 has a thickness S radially variable from a maximum value Smax measured substantially at the radially outer elbow 12, to a minimum value Smin measured substantially at the radially inner elbow 11 and forms, together with a plane P perpendicular to the axis A, passing substantially through the elbow 12, an angle α of oscillation. In particular, the annular reading wall 63 has a thickness S with a value corresponding to its maximum value Smax substantially at an inner diameter Di of the phonic wheel 51 and a thickness S with a value corresponding to its minimum value Smin substantially at an outer diameter De of the phonic wheel 51.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A sealing device for a wheel-hub unit provided with a rolling bearing, the sealing device having a central axis and comprising a screen joined together with an outer ring of the bearing to sealingly isolate the bearing and having:
   a cylindrical mounting wall, coaxial with the central axis and engaged with a collar of an outer ring of the bearing; and
   an annular reading wall, arranged transversely with respect to the axis, connected to the cylindrical wall and facing a phonic wheel mounted inside the bearing; wherein
   the annular reading wall has a thickness radially variable depending on an angle of oscillation of the phonic wheel between an undeformed position, in which an annular front surface of the phonic wheel is equidistant from a plane perpendicular to the axis, and a deflected position, in which the annular front surface of the phonic wheel is arranged equidistant from an annular reading wall, but does not make contact with the annular reading wall.

2. The sealing device according to claim 1, wherein the thickness of the annular reading wall varies from a maximum value to a minimum value measured, respectively, at an inner diameter of the phonic wheel and an outer diameter of the phonic wheel.

3. The sealing device according to claim 1, wherein the annular reading wall forms a radially outer elbow with the cylindrical mounting wall, and a radially inner elbow with a further wall of the screen; the thickness of the annular reading wall varying from a maximum value to a minimum value measured, respectively, at the radially outer elbow and the radially inner elbow.

4. A wheel-hub unit comprising:
   an outer stationary ring,
   an inner rotating ring,
   a phonic wheel,
   at least one ring of revolving members arranged between the outer ring and the inner ring, and
   a sealing device comprising a screen joined together with an outer ring of the bearing to sealingly isolate the bearing and having:

a cylindrical mounting wall, coaxial with the central axis and engaged with a collar of an outer ring of the bearing; and an annular reading wall, arranged transversely with respect to the axis, connected to the cylindrical wall and facing a phonic wheel mounted inside the bearing; wherein the annular reading wall of the sealing device has a thickness radially variable depending on an angle of oscillation of the phonic wheel between an undeformed position, in which an annular front surface of the phonic wheel is equidistant from a plane perpendicular to the axis, and a deflected position, in which the annular front surface of the phonic wheel is arranged equidistant from an annular reading wall, but does not make contact with the annular reading wall.

* * * * *